(12) United States Patent
Mizutani et al.

(10) Patent No.: US 6,448,552 B1
(45) Date of Patent: Sep. 10, 2002

(54) GYRO

(75) Inventors: Natsuhiko Mizutani, Tokyo; Takahiro Numai, Yamanishi, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/524,260

(22) Filed: Mar. 14, 2000

(30) Foreign Application Priority Data

Mar. 16, 1999 (JP) ............................................. 11-070393
Mar. 10, 2000 (JP) ......................................... 2000-067019

(51) Int. Cl.$^7$ ................................................. G01D 5/34
(52) U.S. Cl. .............................. 250/231.12; 250/214 R; 356/459; 356/463
(58) Field of Search ......................... 250/231.12, 214 R; 356/459, 461, 463; 372/94

(56) References Cited

U.S. PATENT DOCUMENTS 4,243,324 A * 1/1981 Friedland .................... 356/350
4,431,308 A   2/1984 Mitsuhashi et al. ......... 356/350
6,275,296 B1  8/2001 Numai ........................ 356/459
6,297,883 B1 10/2001 Numai ........................ 356/459
6,304,329 B1 10/2001 Nitta et al. .................. 356/459

FOREIGN PATENT DOCUMENTS

JP    4-174317    6/1992
JP    5-288556   11/1993

OTHER PUBLICATIONS

K. Bohm, et al., "Direct Rotation–Rate Detection with a Fiber–Optic Gyro by Using Digital Data Processing," Electronics Letters, Nov. 10, 1983, vol. 19, No. 23, pp. 998–999.

* cited by examiner

Primary Examiner—Robert H. Kim
Assistant Examiner—Courtney Thomas
(74) Attorney, Agent, or Firm—Fitzpatrick, Cella, Harper & Scinto (57) ABSTRACT

A gyro comprises a ring resonator type laser, a vibration table for applying an oscillation to the laser, and a signal processor for processing an output signal from the laser. The signal processor determines the phase angle of the output signal from the amplitude of an oscillation cycle component of the vibration table and that of a higher harmonic component thereof.

9 Claims, 5 Drawing Sheets

GYRO

BACKGROUND OF THE INVENTION

1. Field of the Invention

This invention relates to a gyro and, more particularly, it relates to a gyro for detecting the rate and sense rotation by using a ring laser.

2. Related Background Art

Known gyros for detecting the angular velocity of a moving object include mechanical gyros comprising a rotor or an oscillator as well as optical gyros. Particularly, optical gyros are bringing forth technological innovations in the field of gyro technologies due to their remarkable advantages including that they can start to operate instantaneously and have a broad dynamic range.

Various optical gyros are known to date including ring laser type gyros, optical fiber gyros and passive type ring resonator gyros. Of these, the ring laser type gyro that utilizes a gas laser is the earliest comer and gyros of this type are popularly used in aeroplanes at present. In recent years, small and highly sophisticated ring laser type gyros that are integrated on a semiconductor substrate have been proposed. See, inter alia, Japanese Patent Application Laid-Open No. 5-288556, Japanese Patent Publication No. 62-39836 (U.S. Pat. No. 4,431,308) and Japanese Patent Application Laid-Open No. 4-174317.

Figure 7:
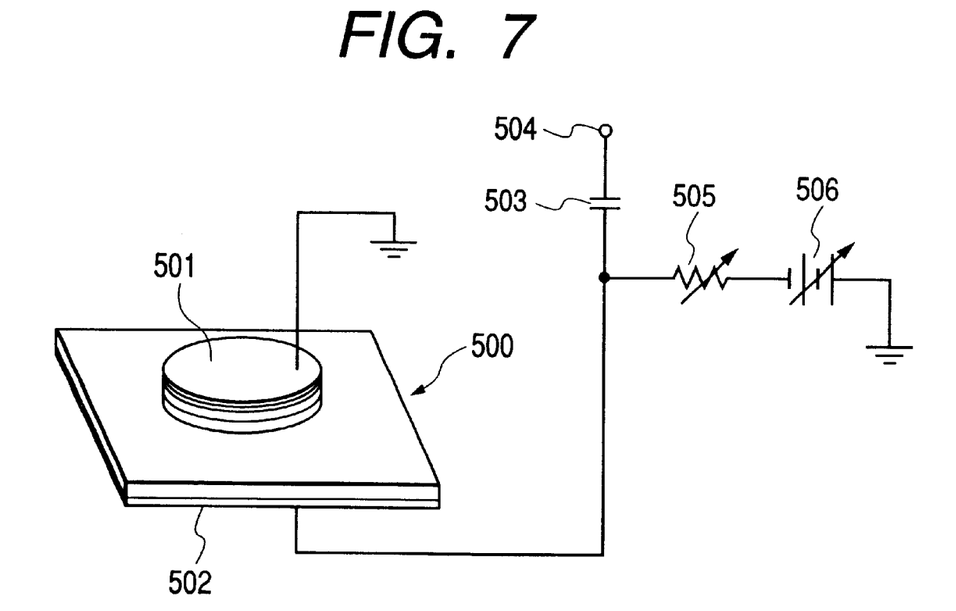
FIG. 7 is a schematic circuit diagram of a known signal processing circuit.

FIG. 7 of the accompanying drawings illustrates a gyro disclosed in U.S. Pat. No. 4,431,308 that utilizes the change in the terminal voltage of a semiconductor laser device caused by rotation without taking out beams to the outside of the semiconductor laser device. Referring to FIG. 7, a semiconductor laser device 500 has upper and lower electrodes 501, 502. In FIG. 7, reference numeral 503 denotes a DC blocking capacitor and reference numeral 504 denotes an output terminal, while reference numeral 505 denotes a resistor. As seen from FIG. 7, the semiconductor laser device with a ring cavity is connected to a drive power source 506 and the frequency difference (beat frequency) between the frequency of the beam propagating clockwise and that of the beam propagating counterclockwise that is caused when a certain angular velocity is applied to the device is detected as a change in the terminal voltage of the laser device.

As a technique for processing the signal from a laser gyro, the oscillation frequency of the output signal may be converted into a voltage signal by means of a frequency-voltage converting circuit. Such a frequency-voltage converter circuit may be a circuit which processes analog signals or which obtains the output voltage by digitizing analog signals to count the number of pulses or by integrating analog signals for a predetermined period of time.

However, when a frequency-voltage converter circuit is used to detect the angular velocity of a known gyro from the frequency of the obtained beat signal, there arises occasions where it is impossible to know the frequency unless the phase angle of the signal shows at least a shift of $2\pi$. For instance, when the angular velocity to be observed is about 0.1 deg/sec. and the frequency of the beat signal taken out from the element is about 1 Hz, it takes about 1 second for the shift of the phase angle of the signal to become equal to $2\pi$. Therefore, a novel device is required to detect an angular vibration change of a gyro used in an anti-vibration system with a response frequency between 1 and 100 Hz. Additionally, there has been a problem that known gyros are not able to detect the sense of rotation.

SUMMARY OF THE INVENTION

Therefore, it is an object of the present invention to provide a signal processing system that can detect the angular velocity within a short period of time even when the frequency of the beat signal is low and to provide a gyro comprising such a signal processing system.

Another object of the invention is to provide a gyro that can detect the sense of rotation.

According to the invention, the above objects are achieved by providing a gyro comprising:

a ring-resonator type laser;

a vibration table for applying an oscillation to the laser; and a signal processing means for processing the output of the laser;

the signal processing means determining the phase angle from the amplitude of an oscillation cycle component of the vibration table and that of a higher harmonic component thereof.

The signal processing means carries out a differential operation on the phase angle to obtain an angular velocity.

The higher harmonic component is a component having a cycle that is twice as long as the oscillation cycle of the vibration table.

The signal processing means operates to obtain the amplitude of the oscillation applied to the vibration table.

Additionally, the present invention is characterized in that the direction of the normal of the resonator of the ring laser agrees with the direction of the axis of rotation of the vibration table.

The present invention is further characterized in that a micro-oscillation having a frequency above the frequency range of the angular velocity signal of an object to be detected is applied to the vibration table.

DESCRIPTION OF THE PREFERRED EMBODIMENTS

Firstly, the signal processing method to be used for a gyro according to the invention will be described below by referring to mathematical expressions.

A clockwise circuit mode and a counterclockwise circuit mode exist independently in a ring resonator where a gain has been obtained by injecting an electric current. If a device does not have any angular velocity relative to an inertial system, the clockwise circuit mode and the counterclockwise circuit mode do not provide any difference in frequency, and there arises a laser oscillation with a resonance wavelength that is closest to the gain peak of the active layer so that the device gives a constant output signal. Now, as the laser gyro rotates clockwise at an angular velocity Q, the oscillation frequency of a first laser beam propagating clockwise is reduced by $\Delta f_1$ from that of the first laser observed when the device is not rotating (formula 1):

$$\Delta f_1 = 2S\Omega/\lambda L \tag{1},$$

where S is the area enclosed by the ring resonator and L is the optical path length of the laser.

At the same time, the oscillation frequency of a second laser beam propagating counterclockwise is raised by $\Delta f_2$ (formula 2):

$$\Delta f_2 = 2S\Omega/\lambda L \tag{2}.$$

Then, a beat having an intensity of light expressed by cos $(\Delta f_2 - \Delta f_1)$=cos $((4S/\lambda L)\Omega)$ is generated in the device. As a result, the impedance of the device changes in response to the intensity of light and, if the device is driven at a constant current, a fluctuation component having the same frequency appears in the voltage signal Sv(t) between the terminals of the device. Then the voltage signal Sv(t) is expressed by formula (3) below:

$$Sv(t) = A_c \cos\left[\int_0^t \{2\pi[\Delta f_1(t') - \Delta f_2(t')]\}dt' + \phi_1\right] + \tag{3}$$

DC component $$= A_c \cos\left[\int_0^t (8\pi S/\lambda L)\Omega(t)dt' + \phi_1\right] +$$

DC component where $\phi_1$ represents a phase constant.

The angular velocity $\Omega(t)$ of the device is the time differential of an azimuth $\theta(t)$ of the device, equation (4) below holds true.

$$\int_0^t \Omega(t')dt' = \theta(t) - \theta(0) \tag{4}$$

Thus, Sv(t) is expressed by formula (5) below:

$$Sv(t) = A_c \cos[(8\pi S/\lambda L)\theta(t) - (8\pi S/\lambda L)\theta(0) + \phi_1] + \tag{5}$$

DC component $$= A_c \cos[(4\pi a/\lambda L)\theta(t) + \phi_2],$$

where $\phi_2 = \phi_1 - (4\pi S/\lambda L)\theta(0)$ and $a = 2S/L$.

If the vibration table is driven by a drive means and a micro-oscillation (dither) of $\theta_d(t) = \theta_d \sin \omega_d t$ is applied thereto, Sv(t) is expressed by formula (6) below:

$$Sv(t) = A_c \cos[(4\pi a/\lambda)(\theta(t) + \theta_d \sin\omega_d t) + \phi_2] \tag{6}$$

$$= A_c \cos[((4\pi a/\lambda)\theta(t) + \phi_2) + (4\pi a/\lambda)\theta_d \sin\omega_d t]$$

$$= A_c \cos[\Phi + d_z \sin\omega_d t],$$

where $\Phi = (4\pi a/\lambda)\theta(t) + \phi_2$ and $d_z = (4\pi a/\lambda)\theta_d$, $\Phi$ representing a phase angle.

If the change in $(4\pi a/\lambda)\theta(t)$ is much slower than the dither frequency $\omega_d$, $\omega_d$ can be subjected to Fourier series expansion, so that Sv(t) is expressed using Fourier series expansion of $\omega_d$ by formula (7) below:

$$Sv(t) = A_c\{J_0(d_z)\cos \Phi - 2J_1(d_z)\sin \Phi \sin \omega_d t + 2J_2(d_z)\cos \Phi \cos 2\omega_d t + 2J_3(d_z)\sin \Phi 3\omega_d t + \ldots\} \tag{7},$$

where $J_n(x)$ is the n-th Bessel function.

With the above described signal processing means, it is possible to obtain sin $\Phi$ and cos $\Phi$ by dividing the amplitude of a component oscillating with an angular frequency of $\omega_d t$ and that oscillating with an angular frequency of $2\omega_d t$ by $2J_1(d_z)$ and $2J_2(d_z)$, respectively.

Then, $\Phi$ is expressed by formula (8) below, using the inverse tangent function of their ratio. Note that the above amplitude can be determined by means of a lock-in amplifier, a spectrum analyser, an FFT analyser or an electric circuit equivalent to one of them.

$$\Phi = \tan^{-1}(\sin\Phi/\cos\Phi)(-\pi/2 < \Phi < \pi/2, \cos\Phi > 0) \tag{8}$$

$$= \tan^{-1}(\sin\Phi/\cos\Phi) + \pi(-\pi/2 < \Phi < 3\pi/2, \cos\Phi < 0)$$

Then, $\Omega(t)$ can be obtained in a form including the sense of rotation by differentiating $\Phi$.

$$\Omega = (\lambda/4\pi a)(d\Phi/dt) \tag{9}$$

Any phase variation greater than $\pi$ can be followed by means of a separately installed counter.

More specifically, the following processing operation will be executed including the two cases expressed by formula (8) above. When cost changes its value from positive to negative, the reading of the counter is incremented by one if sin $\Phi$ is positive, whereas it is decremented by one if sin $\Phi$ is negative.

When cos $\Phi$ changes its value from negative to positive, the reading of the counter is decremented by one if sin $\Phi$ is positive, whereas it is incremented by one if sin $\Phi$ is negative. Thereafter, the counter output 'n' is multiplied by $\pi$ and the value of $\Phi$ is added to the product.

Embodiment 1

The first embodiment of a gyro according to the invention comprises a ring laser having an electrical excitation means, a ring-shaped resonator and an output terminal; a vibration table carrying the ring laser; a drive means for the vibration table and a signal processing means for processing the output signal.

More specifically, the signal processing operation proceeds in a manner as described below. Firstly, the amplitude of the oscillation cycle component of the vibration table and its higher harmonic component are extracted out of the signal obtained from the ring laser, so that the phase angle $\Phi$ of the output signal is determined from their ratio. With this operation, $\Phi$ of formula (8) above is obtained. Then, the angular velocity $\Omega$ is obtained by differentiating $\Phi$, using formula (9).

Thus, according to the invention, the ring laser is oscillated for laser emission by injecting carriers and the vibration table is also oscillated by a drive means, so that the output signal of the ring laser under this condition is processed to obtain the angular velocity from the phase angle of the signal. Thus, the angular velocity can be detected within a short period of time even if the frequency of the beat signal is relatively low.

Embodiment 2

It is also possible to extract the amplitude of the oscillation cycle component of the vibration table and its higher harmonic component from the output signal of the ring laser and the drive signal applied to the vibration table, thereby obtaining the amplitude of the dither from their ratio.

More specifically, the quantity that is determined only by the amplitude $d_z$ of the dither, or "$-J_1(d_z)/J_3(d_z)$", can be obtained by determining the ratio of the amplitude of the $\omega_d$ component and that of the $3\omega_d$ component so that the $d_z$ is obtained from the ratio.

Assume, for example, $0<d_z<6.3$.

Then, a table of numerical values of inverse function $f^{-1}$ of function $f(d_z)=-J_1(d_z)/J_3(d_z)$ is prepared to obtain $d_z$ by using equation $$d_z = f^{-1}(-J_1(d_z)/J_3(d_z)).$$

An example of the table of numerical values is shown below.

| $-J_1(d_2)/J_3(d_2)$ | $d_2$ |
|---|---|
| −100 | 0.486261 |
| −90 | 0.512143 |
| −80 | 0.542653 |
| −70 | 0.579357 |
| −60 | 0.624683 |
| −50 | 0.682637 |
| −40 | 0.760436 |
| −30 | 0.872805 |
| −20 | 1.05637 |
| −10 | 1.44378 |
| 0 | 3.83171 |
| +10 | 6.31174 |
| +20 | 6.34743 |
| +30 | 6.35866 |

Then, if necessary, it is possible to carry out a feedback control in order that the amplitude of the dither applied by the vibration table does not fluctuate as well as to process the signal with elimination of the influence of fluctuations of the dither applied by the vibration table.

The dither frequency of the vibration table is preferably ten times greater than that of the angular velocity change to be detected, more preferably one hundred times greater than that of the angular velocity change to be detected.

Embodiment 3

If the vibration table is provided with a means for detecting the amplitude of its oscillation, the signal processing operation can be carried out by using the detected oscillation amplitude $d_z$.

More specifically, the amplitude of the dither is used in a signal processing operation. Thereby, if necessary, it is possible to carry out a feedback control in order that the amplitude of the dither applied by the vibration table does not fluctuate as well as to process the signal with elimination of the influence of fluctuations of the oscillation applied by the vibration table.

Embodiment 4

It is also possible to detect the dither amplitude from the output of the drive means oscillating the vibration table or the rotary table to process the output signal of the ring laser by said signal processing means, using the value of the oscillation amplitude.

Thus, with this embodiment, a signal processing operation can be carried out by using the detected oscillation amplitude to minimize the influence of fluctuations of the amplitude of the oscillation applied by the vibration table.

Embodiment 5

In this embodiment, the above signal processing means has a means for retaining information on fluctuations of the phase angle of the output signal, which is greater than $\pi$.

With this arrangement, any discontinuous point of the phase angle is eliminated by adding the constant of the phase angle retained by the means for retaining information on fluctuations of the phase angle of the output signal, which is greater than $\pi$, to the phase angle obtained by an arithmetic operation.

More specifically, since the phase angle shows a discontinuous point when the inverse function of the tangent function with a cycle of $\pi$ is used, $\pi$ is added to or subtracted from the phase constant when passing through the discontinuous point to make the sum of the phase constant and the phase angle change continuously.

Embodiment 6

In the sixth embodiment, a micro-oscillation having a frequency band higher than that of the angular velocity signal to be detected is applied to the vibration table.

More specifically, the output signal of the ring resonator type laser is caused to contain the amplitude of the oscillation cycle component of the vibration table and the amplitude of its higher harmonic component in order to obtain the phase angle of the output signal when it is processed.

Now, the present invention will be described by way of examples and also by referring to the accompanying drawings.

EXAMPLE 1

Figure 1:
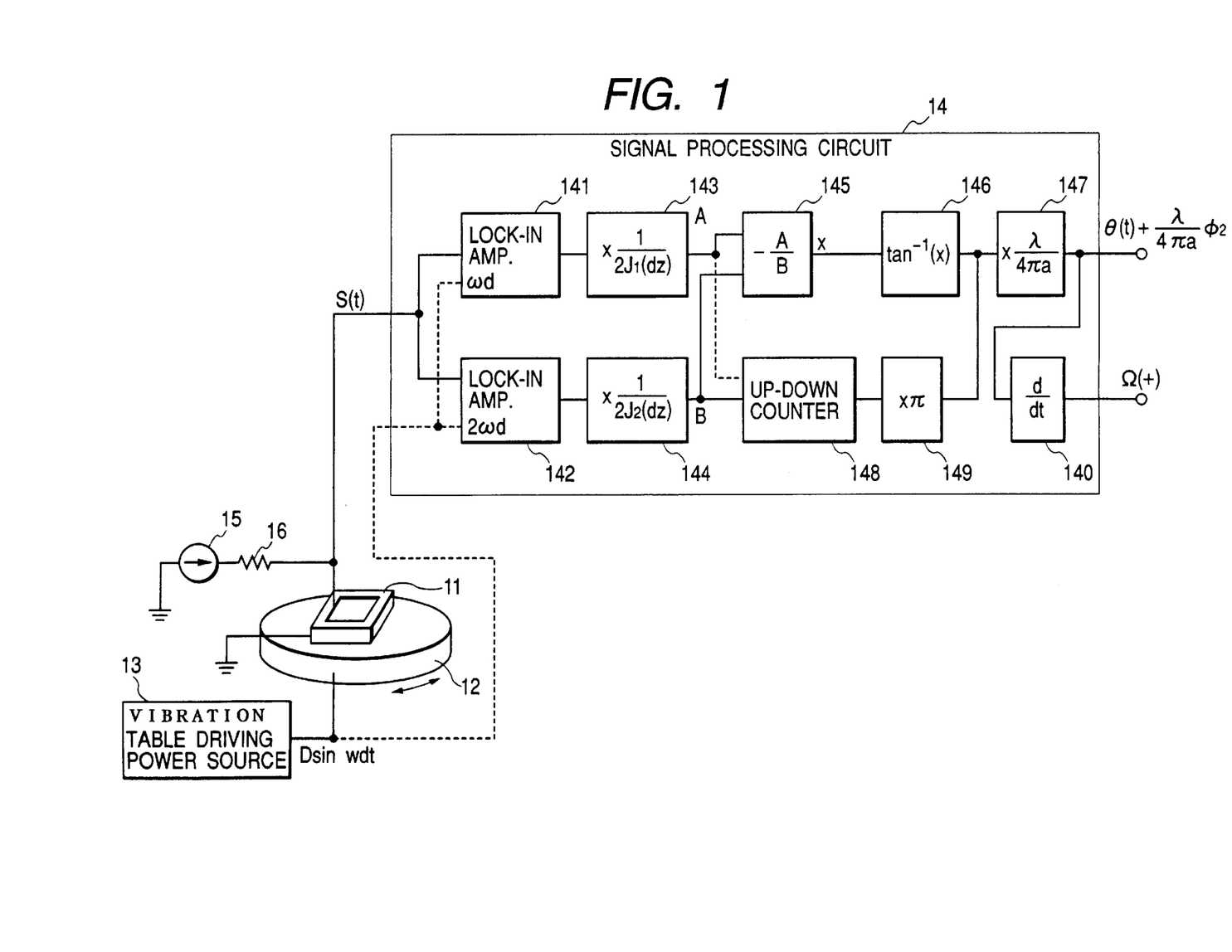
FIG. 1 is a schematic block diagram of a signal processing circuit of the present invention.

FIG. 1 schematically illustrate a gyro according to the present invention. In FIG. 1, there are shown a ring resonator type semiconductor laser device 11, a vibration table 12, a driver 13 for driving the vibration table, a signal processing circuit 14, a current source 15, a protection resistor 16, lock-in amplifiers 141, 142, multiplier circuits 143, 144, 147, 149, a divider circuit 145, an arctangent ($\tan^{-1}$) operational circuit 146, an up-down counter 148 and a differentiator circuit 140.

The device is driven by means of the constant current source 15 by way of the protection circuit 16 to obtain a voltage signal Sv(t) observed between the terminals as an output. When the vibration table 12 is held stationary and immobile relative to an inertial system and therefore the ring resonator type semiconductor laser device 11 is held stationary relative to the inertial system, Sv(t) does not show any fluctuation component.

The vibration table 12 comprises a coil as an actuator. The vibration table 12 has a sensor for detecting its angular displacement, and the thus detected angular displacement is fed back to the driver 13 to obtain a desired angular oscillation. The angular displacement as used herein refers to the extent to which the vibration table 12 has moved from the stationary state.

In this example, a drive current having a sinusoidal waveform was supplied from the driver 13 of the vibration table to change the angular displacement of the vibration table into a sinusoidal waveform. The amplitude $\theta_d$ of the angular displacement was 0.008 degrees and the oscillation frequency was 2 kHz. Under this condition, the angular velocity of the gyro on the vibration table became an oscillation of a sinusoidal wave within ±100 deg/s. $\lambda$ is a wavelength in the laser medium.

When $a=100$ $\mu$m, $\lambda=1.3/3.2=0.41$ $\mu$m and $\theta_d=0.008$ degrees ($0.008\times\pi/180$ rad.), the parameter $d_z$ ($=(4\pi a/\lambda)\theta_d$) was determined to be 0.4. Then, as for the secondary Bessel function for the coefficient of the 2 $\omega_d$ component of the signal Sv(t), the ratio of $J_2(d_z)$ to $J_1(d_z)$ was found to be about 0.1.

The voltage between the terminals of the device driven by a constant current source is monitored to obtain the voltage signal Sv(t). Then, the obtained voltage signal is processed by the signal processing circuit 14 in a manner as described below.

Firstly, the $\omega_d$ component of the dither frequency is taken out by the lock-in amplifier 141 and the 2 $\omega_d$ component thereof is taken out by the lock-in amplifier 142.

Then, they are multiplied by $1/(2J_1(d_z))$ and $1/(2J_2(d_z))$ respectively by means of the multiplier circuits 143, 144 to obtain signals $A(-\sin \Phi)$ and $B(\cos \Phi)$.

Then, the divider circuit 145 carries out a dividing operation of $-A/B$ to obtain signal X. Thereafter, the vector operational circuit 146 is used to obtain $\tan^{-1} X$. A discontinuity occurs in $\tan^{-1} X$ at a position where the sign of the signal B for the frequency component of $2\omega_d$ changes from positive to negative or vice versa (FIG. 6C).

This is because $\tan \Phi$ shows discontinuous points at $\pi/2$, $3\pi/2$, $5\pi/2$, . . . (FIG. 6B). Thus, the following arrangement is made at the points where the sign of signal B ($\cos \Phi$) changes from positive to negative or vice versa.

Figure 6A:
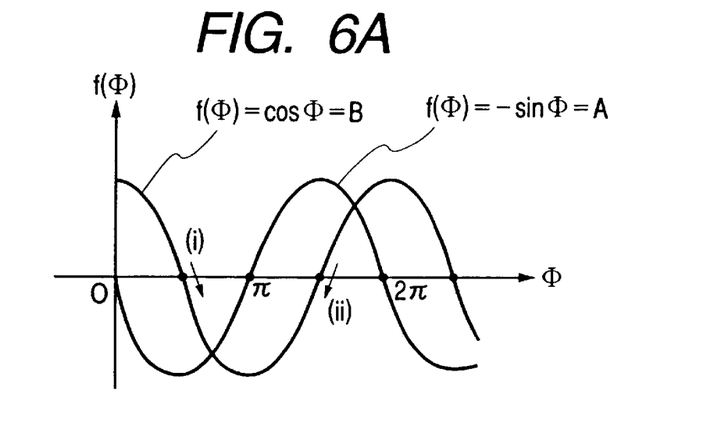
FIGS. 6A, 6B and 6C are graphs illustrating the signal processing operation of a signal processing circuit according to the present invention.
Figure 6B:
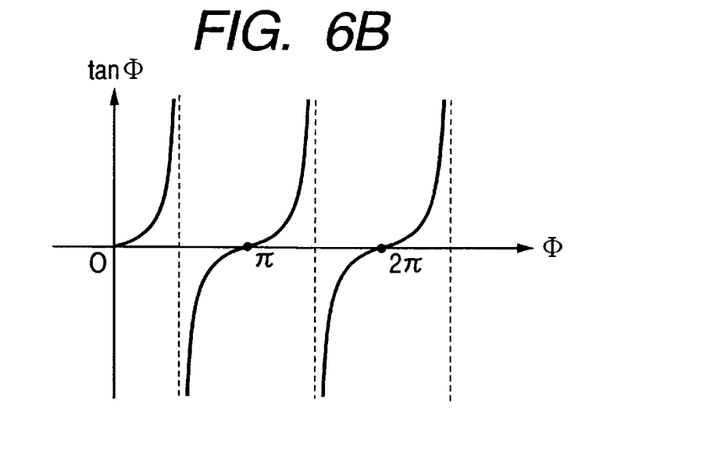
Figure 6C:
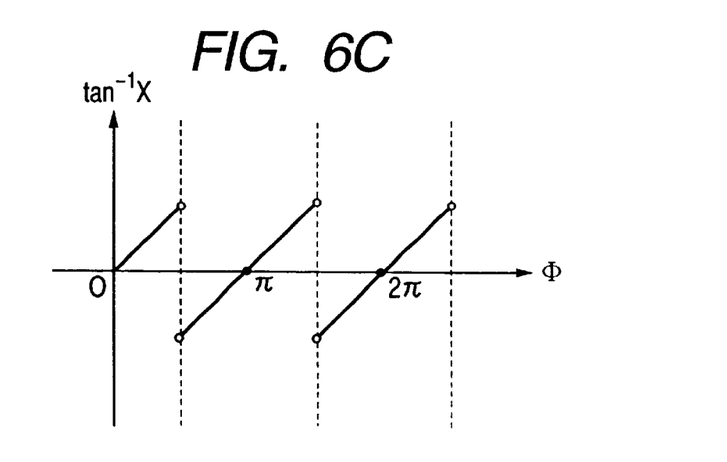

When the sign of the signal B ($\cos \Phi$) changes from positive to negative ((i) and (ii) in FIG. 6A), the following operation is conducted.

(1) If A shows a negative value ((i) in FIG. 6A), $\pi$ is added to $\Phi$ ($\Phi \to \Phi + \pi$).

(2) If A shows a positive value ((ii) in FIG. 6A), $\pi$ is subtracted from $\Phi$ ($\Phi \to \Phi - \pi$).

When the sign of the signal B changes from negative to positive, the above operation is inversely conducted.

In order to conduct these operations the number of the zero-crossing of the phase signal B was counted by way of the up-down counter 148, and then the product of the counted number multiplied by $\pi$ was added to the output from the vector operational circuit 146.

More specifically, when $\cos \Phi$ changes its value from positive to negative, the reading of the counter is incremented by 1 if $\sin \Phi$ is positive, whereas the reading of the counter is decremented by 1 if $\sin \Phi$ is negative.

Similarly, when $\cos \Phi$ changes its value from negative to positive, the reading of the counter is decremented by 1 if $\sin \Phi$ is positive, whereas the reading of the counter is incremented by 1 if $\sin \Phi$ is negative.

Then, the counter output n is multiplied by $\pi$ and the product is added to the value of $\Phi(-\pi/2 < \Phi < \pi/2)$.

The phase angle $\Phi$ of the signal was thus obtained by compensating the discontinuity in this way.

Then, $\theta(t) + (\lambda/4\pi a)\Phi_2$ is obtained by multiplying it by $\lambda/4\pi a$ by means of the multiplier circuit 147. Thus, the phase angle $\theta(t) + (\lambda/4\pi a)\phi_2$ including the offset of the initial phase angle component or the angular velocity $\Omega(t)$ obtained by differentiating the phase angle by means of the differentiator circuit 140 were obtained.

Incidentally, although the amplitude of the dither was obtained as $d_z$ by monitoring the amplitude of the feedback signal from the vibration table, the relationship between the drive voltage and the rotation angle of the vibration table obtained in advance by studying the characteristics of the vibration table may alternatively be used.

If the proportionality constant $4\pi a/\lambda$ as determined by the profile of the device is 960.0, the frequency of the voltage signal Sv(t) was 48 deg/s=0.13 Hz for an angular velocity $\Omega$ of 0.05 deg/s.

When the signal processing circuit could detect a phase angle $\Phi$ of 1 degree, a shift of 1 degree of the phase angle was detected within a sampling period of $1/40$ seconds. Contrarily, with a conventional F-V conversion technique, it takes 7.5 seconds at most for detecting one pulse.

While the semiconductor material was an InGaAsP/InP type material in this example, it may be replaced by a GaAs type, a ZnSe type or an InGaN type material.

Figure 2A:
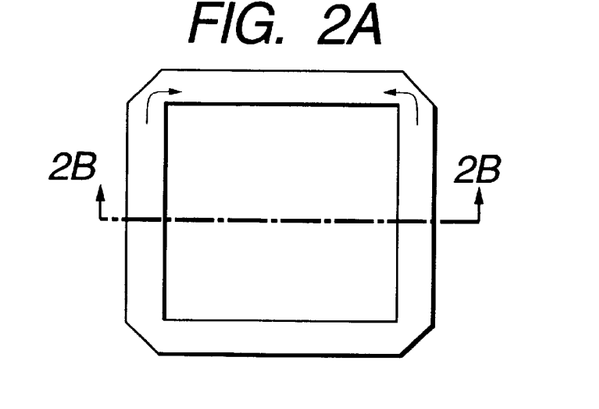
FIG. 2A is a schematic plan view the laser device of an embodiment of a gyro according to the present invention.

The ring resonator type semiconductor laser device 11 of this example was prepared in a manner as described below by referring to FIGS. 2A and 2B. FIG. 2A is a schematic plan view of the laser device and FIG. 2B is a schematic cross sectional view taken along line 2B—2B in FIG. 2A.

Figure 2B:
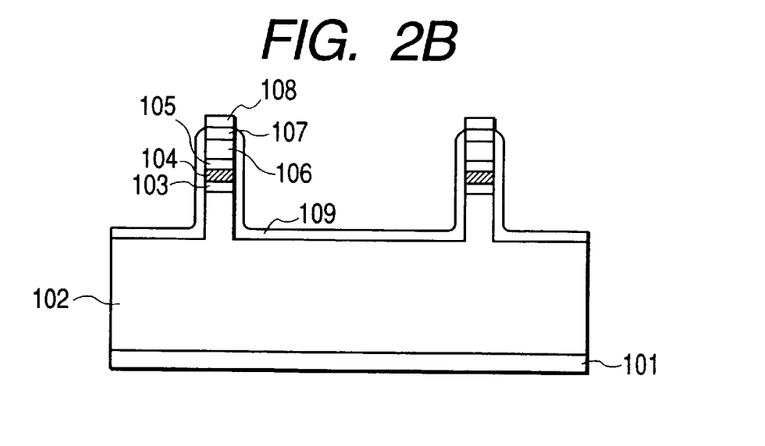
FIG. 2B is a schematic cross sectional view taken along line 2B—2B in FIG. 2A.

Firstly, a semiconductor multilayer structure having a configuration as shown in FIG. 2B was formed by means of an organic metal vapor phase growth method More specifically, a non-doped InGaAsP optical guiding layer (0.15 $\mu$m thick) 103 having a 1.3 $\mu$m composition, an un-doped InGaAsP active layer (0.1 $\mu$m thick) 104 having a 1.55 $\mu$m composition, an un-doped InGaAsP optical guiding layer (0.15 $\mu$m thick) 105 having a 1.3 $\mu$m composition, a p-InP cladding layer (1.5 $\mu$m thick) 106 and a p-InGaAs cap layer 107 were formed on an n-InP substrate 102 by means of a crystal growth technique. Then, photoresist was coated thereon and a mask pattern laid thereon was exposed to light and photographically developed to form a resist pattern having the profile of a waveguide and that of a mirror. Then, a ridge waveguide having a high mesa profile and a mirror were formed with a height of 3 $\mu$m by means of a reactive ion etching technique, using chlorine gas. Then, an SiN film was formed on the entire surface as an insulating film 109 by means of a plasma CVD technique. A contact window was produced by partly removing the SiN film from an upper portion of the ridge waveguide. Then, Cr/Au was deposited on the upper portion of the ridge waveguide and the lateral surface of the mirror by deposition to produce a p-electrode 108 and a reflection film of the mirror. Then, AuGe/Au was deposited on the underside of the wafer to produce an n-electrode 101. The metals were then turned into an alloy in a hydrogen atmosphere to take an ohmic contact between the p- and n-electrodes.

Since the refractive index of the optical waveguide having a semiconductor multilayer structure differs from that of air, light is reflected by the interface thereof. If the semiconductor layer has a refractive index of 3.5, a total reflection occurs on condition that the angle between the normal of the interface and the direction of the entering laser beam is larger than 16.6 degrees. Since the mode in which the total reflection occurs shows a mirror loss lower than any other modes, the device starts to oscillate at a relatively low injected electric current level. Furthermore, since the gain is intensively obtained in this mode, this mode suppresses the oscillations in any other modes. In FIG. 2B, the angle between the normal of the interface and the laser beam is 45 degrees, which hence satisfies the requirement of the total reflection. In this example, the ring resonator type semiconductor laser device was driven by a constant current source so that the oscillation threshold value was 3 mA at a room temperature.

In the ring resonator, a clockwise circular mode and a counterclockwise circular mode exist independently. If the device does not have any angular velocity (and hence held stationary) relative to an inertial system, the oscillation frequency of the clockwise mode and that of the counterclockwise mode do not show any difference and the laser oscillation is generated with the wavelength of the gain peak of the active layer, which was equal to 1.55 $\mu$m.

EXAMPLE 2

Figure 3:
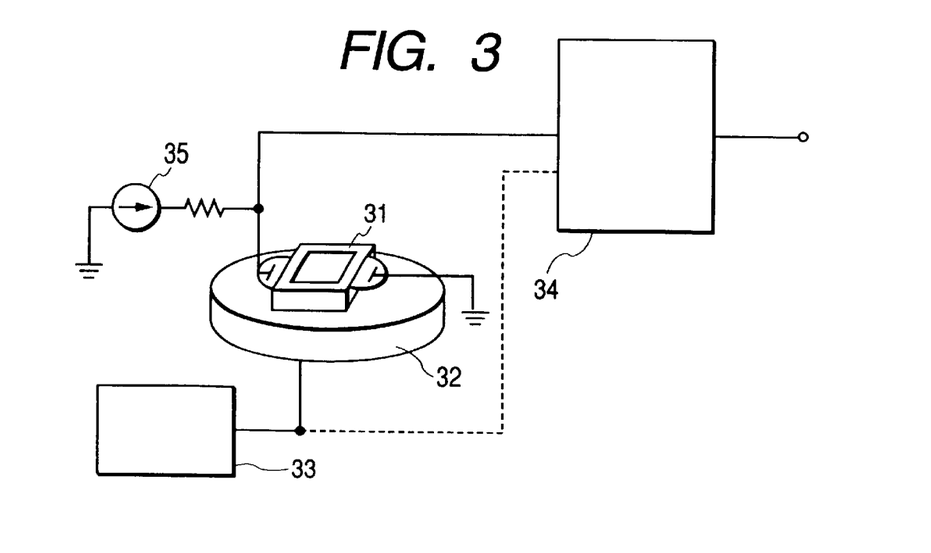
FIG. 3 is a schematic circuit diagram of a gyro according to the present invention.

FIG. 3 shows a gyro of the second example. In FIG. 3, there are shown a ring resonator type gas layer 31, a rotation table 32, a rotation table driver 33, a signal processing circuit 34 and a drive power source 35 of the gas laser.

Figure 4:
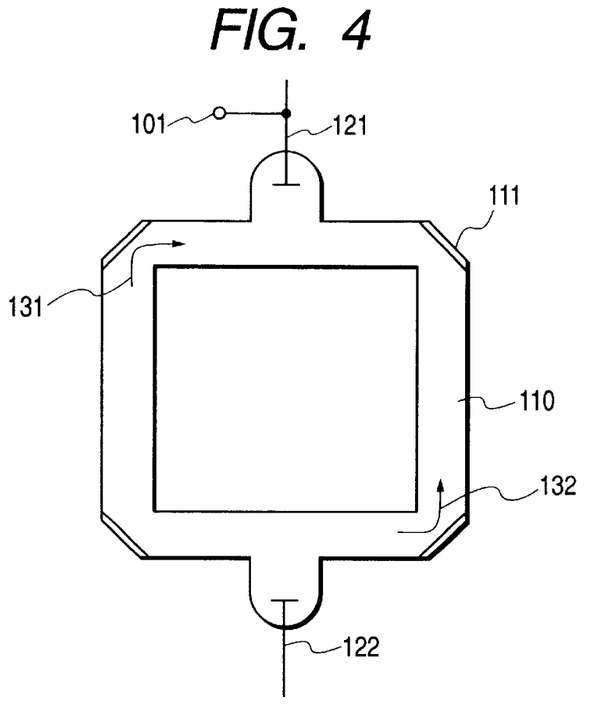
FIG. 4 is a schematic illustration of a ring resonator type gas laser of a gyro according to the present invention.

FIG. 4 shows the ring resonator type gas layer 31 in greater detail. In FIG. 4, there are shown an electric terminal 101, a quartz tube 110 prepared by hollowing a block of quartz, a mirror 111, an anode 121, a cathode 122, a clockwise laser beam 131 and a counterclockwise laser beam 132.

An electric discharge begins when a mixture of helium gas and neon gas is put into the quartz tube 110 of the gas laser 31 and then a voltage is applied between the anode and the cathode, so that an electric current is caused to flow. When the quartz tube 110 is held stationary, the oscillation frequency of the clockwise laser beam is exactly equal to that of the counterclockwise laser beam, which is $4.73 \times 10^{15}$ Hz, and the oscillation wavelength $\lambda$ is 632.8 nm. If the quartz tube is driven to rotate at a rate of 1 degree per second and each side of the resonator has a length of 10 cm, the beat frequency is 496.5 kHz.

If the drive power source 35 is regulated so that the source current is constant, a signal having an amplitude of 100 mV and a frequency of 496.5 kHz is obtained by monitoring the terminal voltage by way of the electric terminal 101.

It may be needless to say that the change in the electric current flowing through the terminals can be detected if the device is driven with a constant voltage. While the change in the terminal voltage was detected in this example, alternatively, the change in the impedance of the electric discharge may be directly observed by means of an impedance meter. Additionally, although a mixture of helium gas and neon gas was used in this example, any other gas may alternatively be used so long as it can generate a laser oscillation.

After driving the gas laser 31 by means of the drive power source 35, the rotation table 32 was driven by means of the driver 33, so that the azimuth $\theta(t)$ of the laser sinusoidally oscillates with an angular frequency of $\omega_d$. As in Example 1, since the signal Sv(t) contains the angular frequency component of $\omega_d$ and its higher harmonic component, their amplitudes were extracted by the signal processing circuit to obtain the phase angle $\Phi$ of the signal Sv(t), which was then differentiated to obtain the angular velocity of the gyro relative to the inertial system as well as the sense of rotation thereof.

A response speed 100 times as high as that when detecting a signal frequency was achieved even when the angular velocity was relatively small.

EXAMPLE 3

Figure 5:
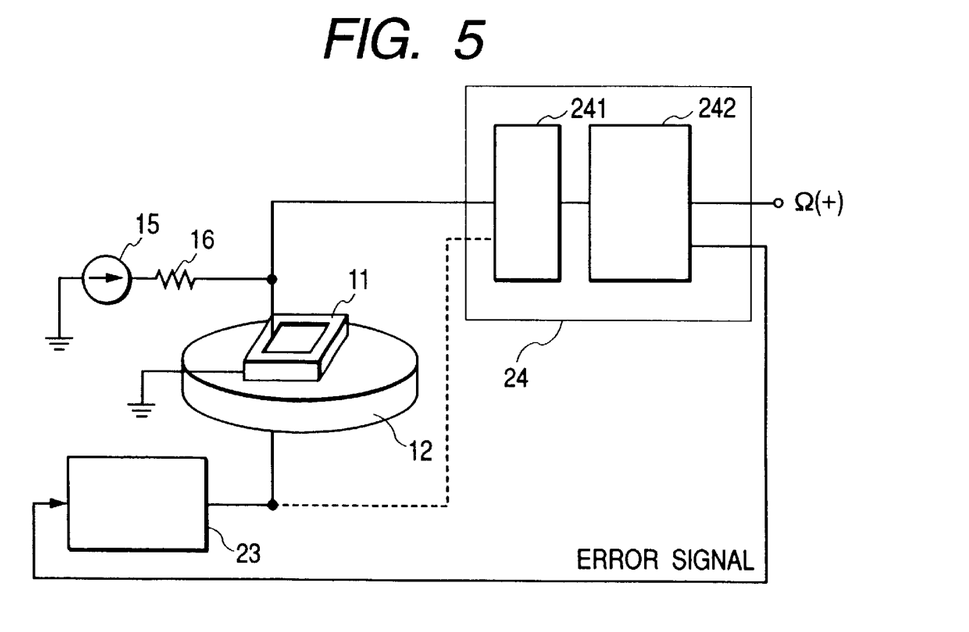
FIG. 5 is a schematic circuit diagram of another gyro according to the present invention.

FIG. 5 schematically illustrates a third example using an optical gyro according to the invention. In FIG. 5, there are shown a ring resonator type semiconductor laser device 11, a vibration table 12, a vibration table driver 23, a digital signal processing circuit 24, a DC current source 15 and a protection resistor 16. Additionally, there are also shown an A/D converter 241 of the input section and a microprocessor 242.

The ring resonator type semiconductor laser device 11 is driven to oscillate by means of the constant current source 15 and the vibration table 12 is driven by the driver to cause an angular displacement of a sinusoidal waveform as in Example 1.

A fast Fourier transform for the digital signal sampled by the A/D converter 241 was conducted in the microprocessor 242 in order to digitally obtain the $\omega_d$ component and its higher harmonic component. The phase angle $\Phi$ was computationally determined by using the signal from the driver 23 as a reference signal.

Then, they were multiplied by a constant, and the ratio thereof was determined, so that the $\tan^{-1}(x)$ was determined by arithmetic operations. Then, the phase held in the counter was added thereto followed by multiplication by a constant to obtain $\theta(t)+\phi_3$, which was then differentiated to produce angular velocity $\Omega(t)$. Note that $\phi_3=(\lambda/4\pi a)\phi_2$.

Additionally, the ratio of frequency component $\omega_d$ to frequency component $3\omega_d$ was determined and then $J_1(d_z)/J_3(d_z)$ was evaluated on the basis of the obtained ratio in the microprocessor 242 in order to determine the amplitude of the dither $d_z$. Note that an error signal was fed back to the driver 23 from the signal processing circuit 24 in order to control $d_z$ into a desired value.

As described above, according to the invention, it is now possible to detect the angular velocity with a small time constant even when the beat signal has a low frequency.

What is claimed is:

1. A gyro comprising:

a ring resonator type laser;

a vibration table for applying an oscillation to said laser; and signal processing means for processing an output signal from said laser, said signal processing means determining the phase angle of the output signal from the amplitude of an oscillation cycle component of said vibration table and the amplitude of a higher harmonic component thereof.

2. A gyro according to claim 1, wherein said signal processing means carries out a differential operation on the phase angle to obtain an angular velocity.

3. A gyro according to claim 1, wherein the higher harmonic component is a component having an angular frequency that is twice as long as an angular frequency of said vibration table.

4. A gyro according to claim 1, wherein said signal processing means operates so as to obtain an amplitude of oscillation applied to said vibration table.

5. A gyro according to claim 1, wherein said vibration table comprises means for detecting the amplitude of oscillation and said signal processing means processes the output signal on the basis of the amplitude of oscillation.

6. A gyro according to claim 1, wherein the amplitude of oscillation is detected from a drive means for driving said vibration table.

7. A gyro according to claim 1, wherein the direction of the normal of the resonator of said ring laser is identical with the direction of the axis of rotation of said vibration table.

8. A gyro according to claim 1, wherein a micro-oscillation having a frequency above the frequency range of the angular velocity signal of an object to be detected is applied to said vibration table.

9. A gyro according to claim 1, wherein said ring resonator type laser is a semiconductor laser.

* * * * *

UNITED STATES PATENT AND TRADEMARK OFFICE
CERTIFICATE OF CORRECTION

PATENT NO. : 6,448,552 B1
DATED : September 10, 2002
INVENTOR(S) : Natsuhiko Mizutani et al.

It is certified that error appears in the above-identified patent and that said Letters Patent is hereby corrected as shown below:

Column 4,
Line 27, "cost" should read -- $\cos \phi$ --.

Column 8,
Lines 58 and 61, "layer" should read -- laser --.

Signed and Sealed this

Twenty-second Day of April, 2003

JAMES E. ROGAN
*Director of the United States Patent and Trademark Office*